United States Patent
Luft (10) Patent No.: US 7,124,415 B1
(45) Date of Patent: Oct. 17, 2006

(54) USE OF TRANSACTION AGENTS TO PERFORM DISTRIBUTED TRANSACTIONS

(75) Inventor: Siegfried Luft, Vancouver (CA)

(73) Assignee: Redback Networks Inc., San Jose, CA (US)

( * ) Notice: Subject to any disclaimer, the term of this patent is extended or adjusted under 35 U.S.C. 154(b) by 550 days.

(21) Appl. No.: 09/903,911

(22) Filed: Jul. 11, 2001

(51) Int. Cl.
*G06F 9/54* (2006.01)
*G06F 15/16* (2006.01)

(52) U.S. Cl. .................. 719/317; 719/316; 709/202; 709/223; 709/238

(58) Field of Classification Search ............... 709/202; 719/317; 718/100, 101
See application file for complete search history.

(56) References Cited

U.S. PATENT DOCUMENTS

| | | | |
|---|---|---|---|
| 5,329,626 A * | 7/1994 | Klein et al. | .................. 709/248 |
| 5,699,523 A | 12/1997 | Li et al. | |
| 6,356,885 B1 | 3/2002 | Ross et al. | |
| 6,404,743 B1 | 6/2002 | Meandzija | |
| 6,411,967 B1 | 6/2002 | Van Renesse | |
| 6,457,053 B1 | 9/2002 | Satagopan et al. | |
| 6,460,070 B1 | 10/2002 | Turek et al. | |
| 6,598,033 B1 | 7/2003 | Ross et al. | |
| 6,751,753 B1 * | 6/2004 | Nguyen et al. | ............... 714/39 |
| 6,772,205 B1 | 8/2004 | Lavian et al. | |
| 6,816,862 B1 | 11/2004 | Mulgund et al. | |
| 2002/0156932 A1 * | 10/2002 | Schneiderman | ............. 709/317 |
| 2003/0009551 A1 | 1/2003 | Benfield et al. | |

OTHER PUBLICATIONS

Chen, Ping-Wen et al. "An Itinerary-Diagram-based Approach for Mobile Agent Application Development." Journal of Science and Engineering, vol. 3, No. 3, pp. 209-227, Nov. 2000.*

Gharib, Hossam et al. "Adlets Migration and Handling in a Distributed Object Environment." IEEE, Mar. 15-17, 2000.*

EURESCOM Participants. "Intelligent and Mobile Agents and their Applicability to Service and Network Management." Jun. 1999.*

Bill Venners "Under the Hood: The architecture of aglets" Apr. 1997 http://www.javaworld.com/javaworld/jw-04-hood-2.html.

Bill Venners "Under the Hood Solve Real Problems with Aglets a Type of Mobile Agent" May 1997 http://www.javaworld.com/javaworld/jw-05-hood.html.

Bill Venners "Under the Hood: The architecture of aglets" Apr. 1997 http://javaworld.com/javaworld/jw-04-1997/jw-04-hood.html.

Danny B. Lange "Java Aglet Application Programming Interface (J-AAPI) White Paper-Draft 2" Feb. 19, 1997 http://www.trl.ibm.co.jp/aglets/JAAPI-whitepaper.html.

Sun Microsystems "Java Dynamic Management Kit Dynamic Management for the Service Age" 1994 http://www.sun.com/software/java-dynamic/wp-jdmk.kit.

(Continued)

*Primary Examiner*—Lewis A. Bullock, Jr.
(74) *Attorney, Agent, or Firm*—Blakely, Sokoloff, Taylor & Zafman LLP (57) ABSTRACT

Use of transaction agents to perform distributed transactions. According to one embodiment of the invention a coordinator transaction agent that includes an itinerary and a state machine is instantiated. The itinerary indicates a plurality of network elements and the plurality of network elements is in communication with the coordinator transaction agent. The coordinator transaction agent causes itself to be replicated onto the plurality of network elements according to the itinerary. Each of the replicated transaction agents causing an indication of their replication to be communicated back to the coordinator transaction agent. The coordinator transaction agent coordinating operations of the state machine in each of the replicated transaction agents to implement a distributed state machine.

50 Claims, 3 Drawing Sheets

OTHER PUBLICATIONS

Danny B. Lange & Yariv Aridor "Agent Transfer Protocol—ATP/0.1" Mar. 19, 1997 http://www.trl.ibm.co.jp/aglets/atp/atp.htm.

Sun Microsystems "Java Dynamic Management Kit White Paper, Dynamic Management for the Service Age" 2000, Sun Microsystems, Inc., 901 San Antonio Road, Palo Alto, California.

Sun Microsystems, Inc. "Technical Information Technical Overview" Copyright 1994-2000 http://www.sun.com/software/java-dynamic/tech-overview.html.

Sun Microsystems, Inc. "Solstice™ Enterprise Agents™" Copyright 1994-2000, http://www.sun.com/software/entagents/docs/DGhtml/intor_agents.doc.html.

Bill Venners "Solve Real Problems with Aglets, a Type of Mobile Agent" May 1997 http://www.javaworld.com/javaworld/jw-05-1997/jw-05-hood_p.html.

Voyager® ORB 4.0 What B2B is Meant to Be. Copyright 1995-2000 http://www.objectspace.com/products/voyager/orb.asp.

Mitsuru Oshima, Guenter Karjoth and Kouichi Ono "Aglets Specification 1.0 Draft" Sep. 8, 1998 http//www.trl.ibl.co.jp/aglets/spec11.html.

"Maintenance Telecommunications Management Network" Generic Network Information Model, International Telecommunication Union, ITU-T, M.3100, Jul. 1995.

"Series G: Transmission Systems and Media Digital Systems and Networks", Digital transmission systems-Digital networks-General aspect, Architecture of transport networks based on the synchronous digital hierarchy (SDH), International Telecommunication Union, ITU-T, G.803, Mar. 2000.

Gwangil Jeon, Yookun Cho, "A System-Level Diagnosis for Internet-based Virtual Private Networks", 1999.

Sun Microsystems, Inc. "Jini Technology and the Java Dynamic Management Kit Demonstration Spontaneous Management in the Service Age"; Copyright 1994-2004.

IBM "Aglets Software Development Kit About Aglets" (Apr. 9, 2001).

Sun Microsystems, Inc. Java Dynamic Mangement Kit: Overview; Copyright 1994-2004.

* cited by examiner

USE OF TRANSACTION AGENTS TO PERFORM DISTRIBUTED TRANSACTIONS

BACKGROUND OF THE INVENTION

1. Field of the Invention

The invention relates to the field of network computing. More specifically, the invention relates to using transaction agents to perform distributed transactions.

2. Description of the Related Art

Providing services to "network elements" (e.g. Switches; Routers; Application Servers; File Servers; End-user Workstations; participants in a TDM ring using SONET/SDH BLSR or UPSR etc.) in a networking environment may consist of many tedious and burdensome tasks.

Circuit Creation

Overview

For example, one method of providing connectivity between "switching network elements" (e.g., routers; switches; gateway servers; participants as nodes of a TDM ring using SONET/SDH and BLSR or UPSR; etc.) is to build a network circuit connection. Network circuit connections provide dedicated connectivity between switching network elements, thereby insuring reliable network throughput and availability along the connection. The process of building a circuit between two or more switching network elements is called network provisioning. Some of the steps associated with provisioning include route selection, physical provisioning, and equipment interconnection. However, today's heterogeneous networking environment makes establishing a circuit connection a tedious task, brimming with potential pitfalls, resulting in a high probability of network failures.

Figure 1:
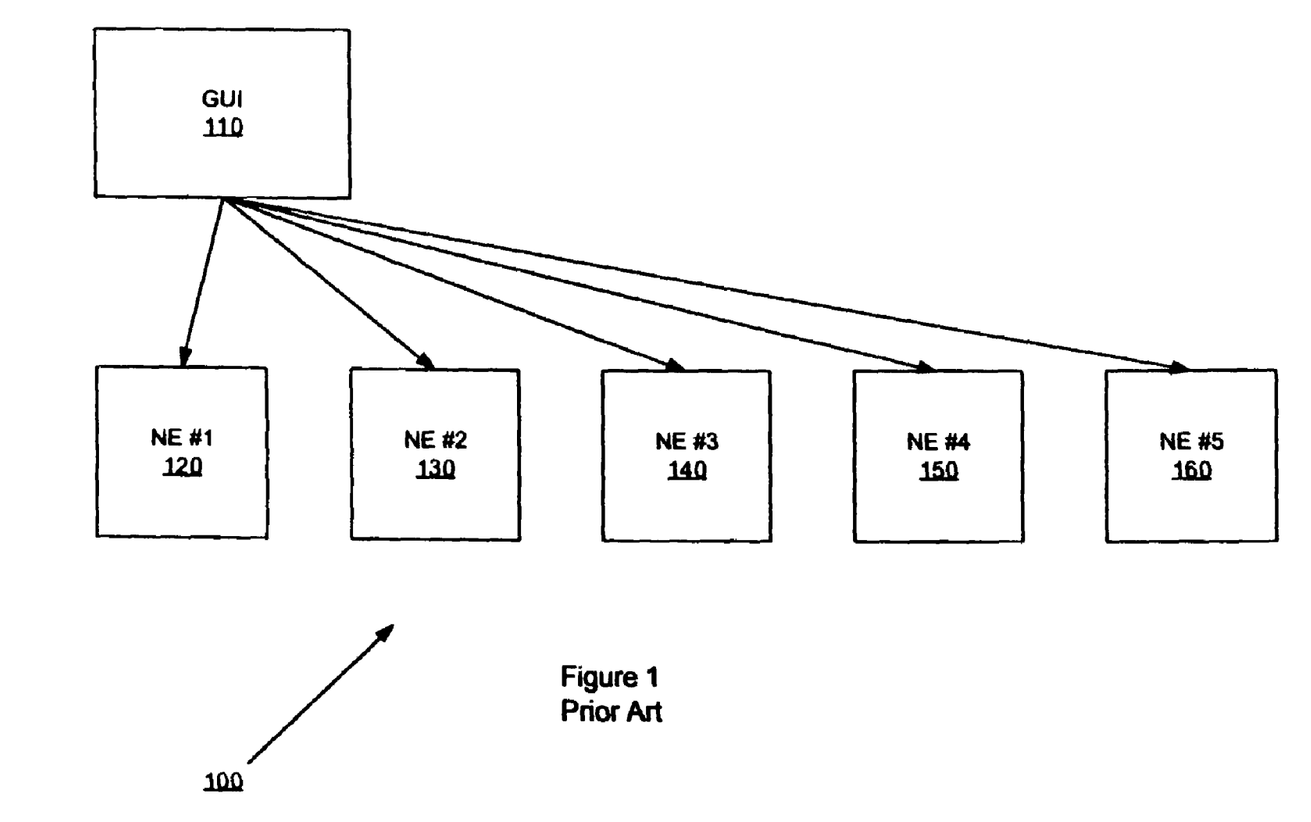
FIG. 1 illustrates how remote circuit provisioning is used to build a circuit by transmitting provisioning instructions to remote switching network elements.

FIG. 1 illustrates how remote circuit provisioning is used to build a circuit by transmitting provisioning instructions to remote switching network elements. In this scenario, a technician connects remotely to a first switching network element 120 from a Graphical User Interface (GUI) 110 running at a remote location. While remotely connected to the first switching network element 120, one may execute a set of instructions to the switching network element 120, instructing the switching network element to provision a cross connect from the first switching network element 120 to a second switching network element 130.

Thereafter, the technician would similarly connect to the remaining switching network elements (switching network element 140, switching network element 150, and switching network element 160), in turn, performing similar operations until a complete circuit connection is built across the network. Depending on the number of network elements, this may become a long process. Since the circuit connection is fully set up in a given switching network element before moving onto the next, what are referred to as partial circuits are created until the last switching network element is processed to complete the circuit.

Additional Detail

A more detailed description of circuit provisioning follows. The traditional circuit provisioning process generally begins with selecting a network route or path to have provisioned. Route selection may include examining a network topology map in order to view the network bandwidth. Here, a manual check may be performed at each switching network element to determine if network bandwidth is available to make the circuit connection feasible. If bandwidth is available, then each switching network element along the path is provisioned. If bandwidth is not available, then an alternate path is selected or new switching network element(s) deployed within the network to provide additional bandwidth.

Primarily, a switching network element routes data within a network and/or from one network connection to another network connection. When provisioning a circuit a "cross connect" is executed within a switching network element to direct an input from the input facility of a first network connection to an output facility of a second network connection. A facility is a set of channels within a switching network element used in connecting the two network connections.

Typically, to provision a switching network element from a remote location, a remote connection is first established with the remote switching network element. A message to disable a first necessary facility is sent to the switching network element. This is followed by a check for a network failure and a check to determine if the connection to the switching network element has failed (e.g. server down, command failed, etc.).

Subsequent to the confirmed disabling of the first facility, a message to disable a second necessary facility is sent to the switching network element and again a check for a network failure is performed. Thereupon, a check for a disconnect failure to the switching network element is again performed.

After both facilities are disabled, a cross connect message is sent to the switching network element to generate the cross connect between both facilities. Then, a check for a network failure is performed, followed by a check for a cross connect failure (server down, command failed, etc.).

Following the programming of the cross connect, a message is sent to enable the first facility. Thereupon, a check for a network failure and an enable failure are performed. If successful, a message is sent to enable the second facility. A check for a network failure is again performed and then a final check is done to determine if an enable failure occurred.

Problems

A mistake to the provisioning of the circuit connection (e.g. wrong determination of network bandwidth) causes problems. Additionally, a mistake may cause the connection between the remote location and one or more of the network elements to be broken. If so, the remote location cannot be used to undo what was done. Rather, the effected switching network element will need to be corrected on location. At a minimum, these mistakes may require the technician to undo at least some of the installed cross connects.

Problems also materialize when an error occurs while un-provisioning a circuit connection. Un-provisioning, which provides for the termination of circuit connections, suffers deficiencies similar to provisioning mainly because un-provisioning also requires the manipulation of each network element to complete the task. For example, if a network technician fails to remove a circuit cross connection from a network element, then that part of the circuit will appear to be in service on a network topology map when, in fact, it is available and has no traffic going across it. Therefore, during subsequent attempts to provision a connection the circuit will appear to be in use, causing one to select a different path when in fact the connection is available. Due to this inaccuracy, inefficiencies develop, causing bottlenecks and delays along certain network paths and potentially no network traffic along others.

Worse yet, if network bandwidth is indeed available but hidden, network managers may prematurely schedule network elements to be upgraded or overlaid, causing an additional inefficient use of resources in time and cost.

Even if a network technician correctly provisions or un-provisions the circuit connection, other similar problems may present themselves if the technician delays or completely foregoes updating the topology map to show the provisioning or un-provisioning of the circuit.

Software Installation/Upgrade

Another example of the burdensome and overwhelming tasks of providing services in a distributed network environment includes installing/upgrading software on remote network elements. Typically, in a decentralized software environment each network element has its own individual copy of a software application resident upon its hard drive. When installing new software applications or software upgrades, software technicians must install in each individual network element the new applications or upgrades. Whether remotely or manually on location this scenario is problematic if the installation or upgrade of the software is an "all-or-nothing deal." For example, in a file-sharing environment, the upgraded software may not be compatible with the older version software. Here, if only some of the network elements upgraded receive the software, file sharing between upgraded and non-upgraded network elements may be hindered until all network elements have been upgraded or the upgraded network elements are restored to the original version. This scenario is especially unacceptable if file-sharing is essential to the user's business.

SUMMARY OF THE INVENTION

Use of transaction agents to perform distributed transactions is described. According to one embodiment of the invention a coordinator transaction agent that includes an itinerary and a state machine is instantiated. The itinerary indicates a plurality of network elements and the plurality of network elements is in communication with the coordinator transaction agent. The coordinator transaction agent causes itself to be replicated onto the plurality of network elements according to the itinerary. Each of the replicated transaction agents causing an indication of their replication to be communicated back to the coordinator transaction agent. The coordinator transaction agent coordinating operations of the state machine in each of the replicated transaction agents to implement a distributed state machine.

DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known protocols, structures and techniques have not been shown in detail in order not to obscure the invention.

The techniques shown in the figures can be implemented using code and data stored and executed on network elements. Such network elements store and communicate (internally and with other network elements over a network) code and data using machine readable media, such as storage media, i.e. magnetic disks; optical disks; random access memory; read only memory; and flash memory devices; or communications media, i.e. electrical, optical, acoustical or other forms of propagated signals (e.g., carrier wave, infrared signals, digital signals, etc.); etc. Of course, one or more parts of the invention may be implemented using any combination of software firmware, and/or hardware.

The invention provides an apparatus and method of using transaction agents to perform distributed transactions. Transaction agents may be used to perform any of a number of distributed transactions. For example, distributed transaction agents can be used to provision a circuit connection over a set of switching network elements in a consistent and automated fashion, eliminating costly manual processes. As another example, transaction agents can be used to install/upgrade software to multiple network elements. It should be understood, however, that the invention is not limited to the exemplary uses of transaction agents identified herein.

Figure 2:
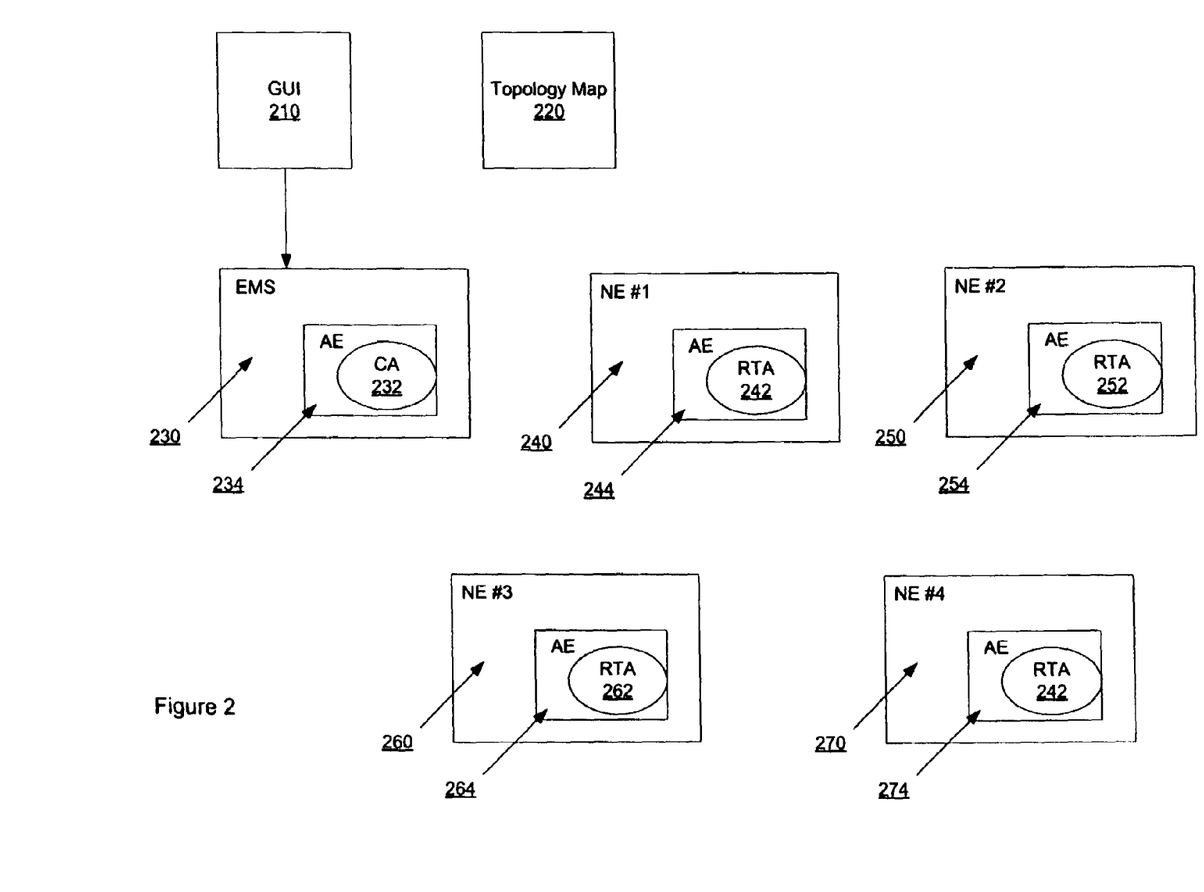
FIG. 2 illustrates how distributed transaction agents are used to install cross connects along a single circuit path through interconnected switching network elements according to one embodiment.

FIG. 2 illustrates how distributed transaction agents are used to install cross connects along a single circuit path through interconnected switching network elements according to one embodiment. By way of example, these switching network elements may be part of an optical fiber, TDM ring, such as a SONET UPSR or BLSR. Here, transaction agents are replicated to four switching network elements in the path to provision cross connects, facilitating a complete circuit.

In general, a transaction agent is a type of state machine that may replicate itself among numerous switching network elements, and depending on specific conditions, perform autonomous operations or transactions in furtherance of a common goal. In one embodiment, the states of the distributed state machine are of two types, replication and task. The replication type involves the replication of the transaction agent to different network elements. In contrast, the task state(s) involve the actual work for which the transaction agent was created. In one embodiment described herein, there is a single replication state (during which the transaction agent is replicated on every network element involved) that is followed by a set of one or more task states. However, alternative embodiments could have additional replication states, and/or intermix replication states with task states. The transaction agents are notified when it is legal to commit a set of one or more transactions and transition to a different state.

Furthermore, each of the transaction agents can determine if the global operation should be aborted (e.g. based on notification, lack of communication, etc.). If the transaction agents abort their operation, a roll back function is invoked at each individual switching network element, thereby restoring the switching network elements to their original state. Hence, the transaction agents may roll back, leaving the network unaffected.

In one embodiment, an end-user (e.g., a network manager) uses a GUI 210 to initiate a process to determine the switching network elements to which to provision a circuit. This may take the form of using a network topology map 220 to determine a list of switching network elements for provisioning (itinerary list) and a list of the facilities in those switching network elements to cross connect (facility list).

Figure 3:
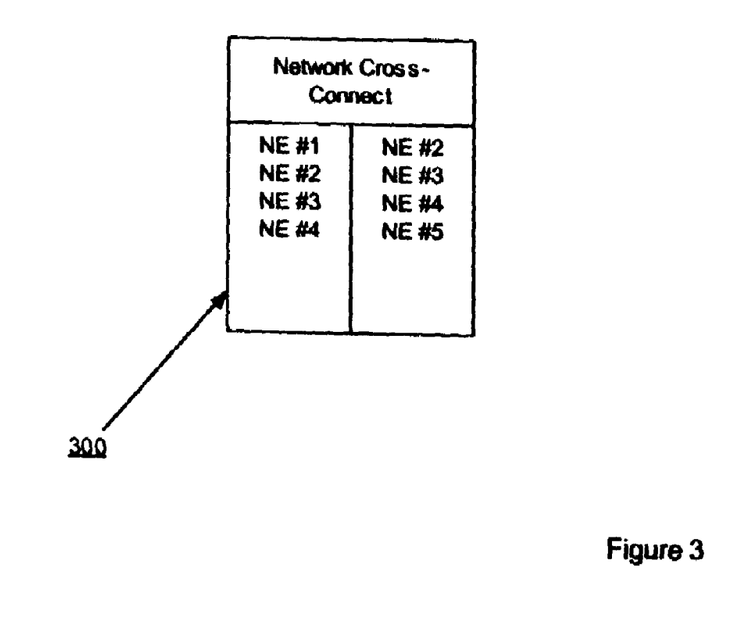
FIG. 3 illustrates the contents of an exemplary itinerary according to one embodiment.

FIG. 3 illustrates the contents of an exemplary itinerary according to one embodiment. In one embodiment, the itinerary is not an active component in that it does nothing without external stimulus.

Thereafter an initial transaction agent is instantiated on switching network element 230. This switching network element also typically contains the element management system (EMS) which manages the network. In one embodiment, this initial transaction agent is labeled the coordinator transaction agent 232, while replications of this coordinator transaction agent are referred to as replicated transaction agents. The coordinator transaction agent 232 has stored therein the itinerary and facility list, and is responsible for coordinating the transition state changes of the replicated transaction agents.

The coordinator and replicated transaction agents communicate with each other through simple messages. In one embodiment, communications between network elements are handled through a Java based mobile agent environment. Agent environments are well known components of Java based Mobile Agent applications and generally hosts the agents and facilitate mechanisms for inter-agent communication.

After initialization, a coordinator transaction agent 232 is given to an agent environment 234 that invokes the replicating of the transaction agent as per the itinerary. Here, replication to each of the switching network elements specified in the itinerary occurs when the coordinator transaction agent's 232 communication thread is first initiated within the agent environment 234. In one embodiment, this replication occurs in a "worm" like manner. In another, each replication is generated by the coordinator transaction agent.

In FIG. 2, a replicated transaction agent 242 arrives at switching network element 240. Responsive to being placed in the agent environment 244 on the switching network element 240 the first state transition is invoked. Here, the replicated transaction agent causes a check to see if it can access the provisioning Application Programming Interface's (API's) of the switching network element 240. Provisioning APIs are the specific hardware and/or software commands used by each individual switching network element to provision a cross connection. The replicated transaction agent 242 attempts to access the provisioning APIs by requesting the local agent environment 244 for a handle to the API. For security reasons, the agent environment 244 knows the location and privileges of the replicated transaction agent 242 and can determine if it should permit this reference. When the replicated transaction agent 242 determines it has authentication to execute all the transactions (by way of the APIs) available to generate the required cross connection, the replicated transaction agent returns with a "success" control token (assuming of course that it was able to get the API reference). If replication is in a "worm" like manner, the agent environment 244 then causes the replicated transaction agent 242 to replicate itself onto the next switching network element in order of the itinerary, here switching network element 250, and perform similar logic to this switching network element in turn.

In one embodiment, when the last switching network element 270 in the itinerary is reached, the transaction agent environment 274 returns a state control token back to the coordinator transaction agent 232. In another embodiment, the control token may travel back, in reverse order, from the last participant replicated transaction agent to the coordinator transaction agent 232. Regardless, of the method, at this point in time, the coordinator transaction agent 232 exists on the switching network element (230), and one replicated transaction agent exists on each of the switching network element 240, 250, 260, and 270 (replicated transaction agent 242, replicated transaction agent 252, replicated transaction agent 262, and replicated transaction agent 272).

If all the replicated transaction agents have successfully returned a "success" state control token with regard to the replication, the replication state of the distributed state machine has been completed.

In one embodiment, the one or more subsequent task state transitions invoke the replicated transaction agents to perform circuit provisioning transactions. Such as to disable the two facilities, enter the cross connect, and then re-enable both facilities. In another embodiment, the replicated transaction agent provisioning transactions may further include disabling the first facility, checking for a disable failure, disabling the second facility, check for a disable failure, entering a cross connect, checking for a cross connect failure, enabling the first facility, checking for an enable failure for the first facility, enabling the second facility, and lastly, perform the last checking for an enable failure for the second facility.

When using transaction agents to provision circuits, the task states can be implemented in a variety of ways. For example, there could be a single task state in which the cross-connects are fully installed. Alternatively, there could be multiple task states, in each of which part of the provisioning is performed in each of the switching network elements involved. For example, in one embodiment, the replicated transaction agents transition from one state to another when they successfully disable all facilities on the switching network element. Next, the replicated transaction agents transition to another state upon successfully entering the cross connect on their switching network element. The replicated transaction agents transition to yet another state upon successfully enabling all facilities within the switching network element.

In one embodiment, the replicated transaction agents transition from state to state in lock step with each other. That is, the replicated transaction agents perform the provisioning transactions in parallel or simultaneously. In another embodiment, each of the replicated transaction agents performs one state transition, in turn, before the first transaction agent is allowed to transition to its next state. For example, in one embodiment, responsive to the completion of the replication state(s) of the distributed state machine, the coordinator agent 232 sends a new state token to the replicated transaction agent 242. Upon receiving this token from the coordinator transaction agent 232, the agent environment 244 invokes the next state transition for the replicated transaction agent 242. This state invokes the replicated transaction agent 242 to request from the agent environment 244 the identity of the current switching network element. Using this value, the replicated transaction agent 242 determines which facilities are to be disabled by associating its facility list with switching network element 240. Upon successfully disabling all facilities for switching network element 240, the state returns with success, and the agent environment 244 forwards the next state token to the next switching network element in the itinerary. This procedure repeats itself until all replicated transaction agents have completed their designated transactions. Of course, it is to be understood the invention is not limited to the described embodiments for transitioning states and alternative embodiments may be implemented that remain within the scope of the invention.

As a result of the autonomous nature of the replicated transaction agents, the coordinator transaction agent 232 need only coordinate the replicated transaction agents replication and state transitions on the switching network elements; the coordinator transaction agent 232 does not have to check for network failures. Rather, each of the replicated transaction agents check for network failures in their respective switching network element. The coordinator transaction agent 232 waits to receive status messages from the replicated transaction agents.

If a problem develops during the replication or the state of machine operation, the roll back feature is invoked. Such roll back features can be responsive to a number of stimuli including a communication from another transaction agent, a temporal constraint, etc.

For example, if one of the replicated transaction agents fails to perform an operation, the particular state control token returns with a descriptive failure message. In one embodiment a failure state may be initiated by operator control as well as by one of the state machines' failure/abortion. If a failure occurs, rather than issuing a success state control token, the replicated transaction agent issues a failure state control token to all replicated transaction agents in the itinerary. These replicated transaction agents then proceed to invoke an exception state. The exception state causes the roll back—each replicated transaction agent autonomously undoes/reverses whatever state transitions have occurred.

Where temporal constraints are also used, the exception state is invoked upon a time-out condition when a switching network element fails to successfully perform its required set of transactions within a specific period of time. For example, assume the transaction agents have been replicated to half of the switching network elements (e.g., switching network element 240 and switching network element 250) when network communication fails between the switching network elements in the network. Here, the replicated transaction agent 262 is unable to notify the others that its transactions have either succeeded or failed. In this situation, the replicated transaction agent 242 and replicated transaction agent 252 on the switching network element 240 and switching network element 250 respectively will eventually time-out. Therefore, these replicated transaction agents will autonomously roll back their state transitions within a specific time frame. To provide another example, assume that replication of the transaction agent to the required switching network elements has been successful, but that the performance of one of the transactions by one of the replicated transaction agents has caused a communication failure (e.g., a failure in the communication link between the EMS in the switching network element 230 and one or more of the switching network elements 240, 250, 260, and 270; a failure in communication between different ones of the switching network elements; etc.). Previously, this type of failure would often require a technician to go to the physical location of the network element to undo the transaction(s) so that communication could be reestablished. However, as a result of this communication failure, communication between at least certain of the replicated transaction agents (referred to herein as the "isolated replicated transaction agent") and the coordinator transaction agent will not occur. The implementation of the roll back feature triggered by a temporal constraint (a timeout) will result in these isolated replicated transaction agents undoing their transactions (those replicated transaction agents that are not isolated, will also implement the roll back function as a result of a temporal constraint and/or a failure message), thereby reestablishing the communication link between the various switching network elements. Thus, this type of automatic transaction roll back eliminates the need for a technician to go to the remote location in those situations where the provisioning transactions has caused connections between the network management system server and a network element to fail.

Thus, in one embodiment, upon a failed transaction, the coordinator transaction agent 232 simply reports the failure to the user who invoked the process; it does not need to do any further processing, because it knows that all replicated transaction agents have rolled back their state, as per the defined exception handler. Furthermore, it is understood that the replicated transaction agents will terminate automatically upon completion of the exception state.

In one embodiment, the coordinated execution of distributed transactions across a network is performed using a modified two phase commit (2PC) protocol. Typically, the first phase of the protocol completes when the coordinator transaction agent 232 receives a state control token from all replicated transaction agents. In one embodiment, the success state control token indicates to the coordinator transaction agent 232 that each replicated transaction agent is prepared to enter the second phase and commit or execute a set of circuit provision transactions on each switching network elements. That is, all the replicated transaction agents are prepared to execute a set of provision APIs and transition to a next state. A fail state control token will invoke the coordinator transaction agent 232 to provide the requestor with a message describing the processes failure.

For example, a success state control token received by the coordinator transaction agent 232 on the last executed operation is treated as being equivalent to a "yes" vote for all prior distributed transactions. If at any point prior to this a transaction failed to execute on any replicated transaction agent, a "no" vote is assumed. The second phase of the protocol involves sending out a commit (in the case of a yes vote) or roll back message (in the case of a no vote) to each of the replicated transaction agents.

In one embodiment, a receive and forward strategy is used to communicate messages to the replicated transaction agents. That is, the coordinator transaction agent 232 initiates the distributed transactions by sending a message to the replicated transaction agent 242 on the first switching network element in the itinerary list. That replicated transaction agent and each subsequent replicated transaction agent is then responsible for forwarding any received messages to its neighbor (e.g., the next switching network element as specified by the itinerary). Each agent will only report transition to a success state if all previous agents in the itinerary have also reported transition to a success state. Therefore, in this embodiment, status messages received by the coordinator transaction agent are cumulative. This minimizes any communication bottlenecks resulting from a relatively slow-speed link.

In an alternative embodiment, a centralized control methodology is used to communicate the messages. Here, the coordinator transaction agent 232 receives status messages from and forwards all instructions to each replicated transaction agent. That is, the coordinator transaction agent 232 acts as a centralized control. For example, the coordinator transaction agent 232 will replicate a transaction agent to the switching network element 240 as described above, however, upon completion of replication to the switching network element 240, the coordinator transaction agent 232 will connect directly to the next switching network element 250 on the itinerary list and await a response that the second replicated transaction agent 252 has replicated. This process continues until all the replicated transaction agents have arrived at the switching network elements specified on the itinerary list. In this embodiment, no communication is performed between the replicated transaction agents and thus inter-node communication is between each individual replicated transaction agent and the coordinator transaction agent.

In certain embodiments, distributed transaction agents are used to un-provision circuits. That is, distribute transactions are replicated to remote switching network elements to tear-down a circuit. Here, the coordinator transaction agent is created containing an itinerary list of the switching network elements and the cross connection to be disabled. The coordinator transaction agent then replicates the transaction agents to the switching network elements by way of the various embodiments described to provision a circuit. However, here, the replicated transaction agents perform transactions to un-provision the cross connections.

Another exemplary use of transaction agents is to label connections with identifiers. For instance, in a network environment containing cross connects, transaction agents may be replicated to each switching network element with transactions to tag each cross connection with an identifier. Upon completion, a message will be returned from the a replicated transaction agents to the coordinator transaction agent 232 containing the identifier of each cross connection. The cross connection identifiers may be used to view, edit, and delete connections after they have been created. In another embodiment, this information may be provided to applications such as a network Topology Map, Alarm/Events, Root Cause Analysis, and Alarm Correlation applications for associating faults in the network with user resources.

Another exemplary use of transaction agents is the distribution of software to multiple network elements. Here, the distributed transaction agents perform a set of transactions to install or upgrade software on network elements provided in an itinerary. In one embodiment, the installation or upgrade of software on network elements must be performed on all the network elements on the itinerary or else the installation or upgrade is useless (e.g., an "all or nothing" scenario). In this embodiment, if all of the replicated transactions agents successfully installed or upgraded the software, all transactions will be committed. In contrast, if any of the replicated transactions agents fail to install or upgrade the software, all transactions will be rolled back.

It should be understood that although an embodiment distinguishes between the coordinator transaction agent and replicated transaction agents, the coordinator transaction agent may perform the functionality's of a replicated transaction agent.

While the invention has been described in terms of several embodiments, those skilled in the art will recognize that the invention is not limited to the embodiments described.

The method and apparatus of the invention can be practiced with modification and alteration within the spirit and scope of the appended claims. The description is thus to be regarded as illustrative instead of limiting on the invention.

What is claimed is:

1. A machine-storage medium that provides instructions, which when executed by a set of one or more processors, cause said set of processors to perform operations comprising:
    instantiating a coordinator transaction agent that includes an itinerary and an agent state machine, said itinerary indicating a plurality of network elements, said plurality of network elements in communication with said coordinator transaction agent;
    said coordinator transaction agent causing itself to be replicated onto said plurality of network elements according to said itinerary;
    each of said replicated transaction agents causing an indication of their replication to be communicated back to said coordinator transaction agent; and
    said coordinator transaction agent creating a coordinated distributed state machine that coordinates circuit operations with the plurality of network elements by coordinating operations to said agent state machine in each of said replicated transaction agents to manage a circuit between the network elements.

2. The machine-storage medium of claim 1, wherein said coordinator transaction agent causing itself to be replicated comprises:
    said coordinator transaction agent causing communication of a replication of said coordinator transaction agent to a first of said plurality of network elements;
    said replicated transaction agent in said first network element causing communication of a replication of itself to a second of said plurality of network elements.

3. The machine-storage medium of claim 1 further comprising:
    a first of said replicated transaction agents autonomously rolling back said state machine based on a criteria.

4. The machine-storage medium of claim 3 wherein said criteria includes determining a time out period has been consumed.

5. The machine-storage medium of claim 1 wherein said coordinator transaction agent includes a facility list, said facility list comprising a list of facilities to cross connect within a network element.

6. The machine-storage medium of claim 1 wherein said manage a circuit includes:
    disabling a first facility and a second facility;
    entering a cross connect for both facilities; and
    enabling said first facility and second facility.

7. The machine-storage medium of claim 1 wherein said distributed state machine is transitioned in lock step.

8. The machine-storage medium of claim 1 wherein said distributed state machine is transitioned in turn.

9. The machine-storage medium of claim 1, wherein said manage a circuit causes the formation of a circuit through said plurality of network elements.

10. The machine-storage medium of claim 1, wherein said manage a circuit causes the destruction of a circuit through said plurality of network elements.

11. The machine-storage medium of claim 1, wherein said manage a circuit causes the labeling of a circuit cross connection through said plurality of network elements.

12. The machine-storage medium of claim 1 further comprising:
    each of said replicated transaction agents autonomously rolling back said state machine based on a criteria.

13. The machine-storage medium of claim 1 wherein said plurality of network elements are switching network elements.

14. The machine-storage medium of claim 1, wherein operations of manage a circuit causes:
    said coordinator transaction agent causing communication of a program to a first of said plurality of network elements;
    said replicated transaction agent in said first network element causing communication of said program to a second of said plurality of network elements.

15. The machine-storage medium of claim 14 wherein said network element is a computing network element.

16. A machine-storage medium that provides instructions, which when executed by a set of one or more processors, cause said set of processors to perform operations comprising:
  A) instantiating a coordinator transaction agent that includes an itinerary and an agent state machine, said itinerary indicating a plurality of network elements onto which said transaction agent is to be replicated, said plurality of network elements in communication with said transaction agent, wherein said coordinator transaction agent creates a coordinated distributed state machine that coordinates circuit operations with the plurality of network elements by coordinating operations to said agent state machine in each of said replicated transaction agents to manage a circuit between the network elements;
  B) said coordinator transaction agent causing itself to be replicated and transmitted out;
  C) said coordinator transaction agent receiving from each of said replicated transaction agents an indication of their replication;
  D) said coordinator transaction agent transmitting an indication for delivery to each of said replicated transaction agents that instructs them to perform a currently selected step of said agent state machine in their network element;
  E) said coordinator transaction agent receiving from each of said replicated transaction agents an indication of their completion of said currently selected step; and
  said coordinator transaction agent selecting a next state as said currently selected state of said agent state machine and repeating D and E until a final state of said distributed state machine is reached.

17. A machine-storage medium that provides instructions, which when executed by a set of one or more processors, cause said set of processors to perform a method operations comprising:
  receiving at a network element a replication of a transaction agent that includes an itinerary and an agent state machine, said itinerary indicating a plurality of network elements onto which said transaction agent is to be replicated;
  said network elements responsive to said replicated transaction agent, transmitting an indication of said replicated transaction agent's instantiation to a coordinator transaction agent, said coordinator transaction agent creating a coordinated distributed state machine that coordinates circuit operations with the plurality of network elements by coordinating operations to said agent state machine in each of said replicated transaction agents to manage a circuit between the network elements;
  said network element, responsive to said replicated transaction, replicating said replicated transaction agent and transmitting said replication to one of said plurality of network elements;
  responsive to receiving state advance communications from said coordinator transaction agent, said replicated transaction agent in said network element causing the performance of the next state of said agent state machine; and
  responsive to said replicated transaction agent in said network element detecting successful or unsuccessful completion of the current state in its network element, causing the transmission of an indication to said coordinator network element.

18. The machine-storage medium of claim 17 wherein said detecting said unsuccessful completion of the current state is caused by the failure of said replicated transaction agent to successfully complete a set of transactions.

19. The machine-storage medium of claim 18 wherein said replicated transaction agent invokes a roll back of said set of transactions.

20. The machine-storage medium of claim 17 further comprising said replicated transaction agent invoking transactions to provision a cross connect.

21. The machine-storage medium of claim 20 further comprising a facility list, said facility list containing a list of facilities to cross connect within said network element.

22. The machine-storage medium of claim 20 wherein said invoking transactions to provision a cross connect includes:
  disabling the facilities to have said cross connect;
  generating said cross connect for said facilities; and
  enabling said facilities.

23. A machine-storage medium that provides instructions, which when executed by a set of one or more processors, cause said set of processors to perform operations comprising:
  generating a coordinator transaction agent, said coordinator transaction agent includes an itinerary component and agent state machine, said itinerary component includes a list of network elements to replicate to;
  replicating a plurality of transaction agents from the coordinator transaction agent to said plurality of network elements as described in said itinerary component;
  detecting said plurality of said transaction agents have replicated to said plurality of network elements; and
  instructing said state machines of said plurality of transaction agents to alter state upon executing a set of transactions, wherein the set of transactions create a coordinated distributed state machine that coordinate circuit operations with the plurality of network elements by coordinating operations to said agent state machine in each of said replicated transaction agents to manage a circuit between the network elements.

24. The machine-storage medium of claim 23 wherein said set of transactions includes transactions to provision a circuit connection.

25. The machine-storage medium of claim 23 wherein said set of transactions includes transactions to install software.

26. The machine-storage medium of claim 23 wherein said set of transactions includes transactions to label cross connects.

27. The machine-storage medium of claim 23 wherein said set of transactions includes transactions to un-provisioning a circuit connection.

28. The machine-storage medium of claim 23 wherein each of said plurality of transaction agents include a facility list, said facility list comprising a list of facilities to cross connect within a network element.

29. The machine-storage medium of claim 23 wherein said set of transactions includes transactions to:
  disable a first facility and a second facility;
  enter a cross connect for both facilities; and
  enable said first facility and second facility.

30. The machine-storage medium of claim 23 wherein said detecting further comprises:
  delivering to said coordinator transaction agent a message from said plurality of transaction agents notifying said coordinator transaction agent that each of said plurality of replicated transaction agents is prepared to execute transactions to generate a circuit connection.

31. The machine-storage medium of claim 30 wherein said message is delivered from a last one of said plurality of transaction agents to be replicated.

32. The machine-storage medium of claim 23 wherein said plurality of transactions agents execute said set of transactions in lock step.

33. The machine-storage medium of claim 23 wherein said plurality of transactions agents execute said set of transactions in turn.

34. The machine-storage medium of claim 23 wherein said instructing further comprises:
   delivering a message from said coordinator transaction agent to one of said plurality of transaction agents, said message instructing said state machine to transition state.

35. The machine-storage medium of claim 34 wherein said message is delivered to a first of said plurality of transaction agents to be replicated.

36. The machine-storage medium of claim 23 wherein said coordinator transaction agent is resident on a EMS.

37. The machine-storage medium of claim 23 wherein said coordinator transaction agent and said plurality of transaction agents are a type of mobile agent.

38. The machine-storage medium of claim 23 wherein said coordinator transaction agent and said plurality of transaction agents reside in agent environments.

39. The machine-storage medium of claim 23 wherein said replicating a plurality of transaction agents includes:
   receiving authentication from said network elements before replicating.

40. The machine-storage medium of claim 23 wherein said detecting and instructing, together represents a distributed two-phase commit protocol.

41. The machine-storage medium of claim 23 further comprising:
   responding to an unsuccessful state transition with a transaction roll back.

42. The machine-storage medium of claim 41 wherein said unsuccessful state transaction is caused by a transaction time-out mechanism.

43. A network element comprising:
   a coordinator transaction agent, the coordinator transaction agent including,
      an agent state machine to coordinate a distributed sequence of transactions across a plurality of network elements;
      an itinerary identifying said plurality of network elements; and
   said distributed sequence of transactions to be performed on said plurality of network elements, said agent state machine including states to replicate said coordinator transaction agent to said plurality of network elements and execute said distributed sequence of transactions, wherein the set of transactions create a coordinated distributed state machine that coordinate circuit operations with the plurality of network elements by coordinating operations to said agent state machine in each of said replicated transaction agents to manage a circuit between the network elements.

44. The network management system of claim 43 wherein said sequence of transactions include transactions to provision a circuit.

45. The network management system of claim 43 wherein said sequence of transactions include transactions to install software.

46. The network management system of claim 43 wherein said sequence of transactions includes transactions to label cross connects.

47. The network management system of claim 43 wherein said sequence of transactions includes transactions to un-provision a circuit.

48. The network management system of claim 43 wherein said coordinator transaction agent is resident on a EMS.

49. The network management system of claim 43 further comprising:
   a viewer, said viewer requesting said circuit connection to be generated, said viewer receiving a message from said coordinator transaction agent that the circuit connection is complete.

50. The network management system of claim 43 where said coordinator transaction agent is a type of Java based mobile agent.

\* \* \* \* \*